United States Patent
Kristoffersen

(10) Patent No.: US 7,297,118 B2
(45) Date of Patent: Nov. 20, 2007

(54) ULTRASOUND METHOD AND APPARATUS FOR MULTI-LINE ACQUISITION

(75) Inventor: Kjell Kristoffersen, Oslo (NO)

(73) Assignee: GE Medical Systems Global Technology Company, Waukesha, WI (US)

( * ) Notice: Subject to any disclaimer, the term of this patent is extended or adjusted under 35 U.S.C. 154(b) by 362 days.

(21) Appl. No.: 10/719,434

(22) Filed: Nov. 21, 2003

(65) Prior Publication Data

US 2005/0010111 A1  Jan. 13, 2005

Related U.S. Application Data

(60) Provisional application No. 60/477,826, filed on Jun. 12, 2003.

(51) Int. Cl.
*A61B 8/00* (2006.01)

(52) U.S. Cl. .................................................. 600/447

(58) Field of Classification Search ........ 600/443–449, 600/454–456, 458; 128/916; 73/625–626; 367/103–105
See application file for complete search history.

(56) References Cited

U.S. PATENT DOCUMENTS

| | | | |
|---|---|---|---|
| 5,117,238 A * | 5/1992 | Silverstein et al. ......... | 342/373 |
| 5,349,525 A | 9/1994 | Dunki-Jacobs et al. | |
| 5,369,624 A | 11/1994 | Fukukita et al. | |
| 5,388,079 A | 2/1995 | Kim et al. | |
| 5,469,851 A | 11/1995 | Lipschutz | |
| 5,477,859 A * | 12/1995 | Engeler ...................... | 600/447 |
| 5,544,128 A | 8/1996 | Kim et al. | |
| 5,549,111 A * | 8/1996 | Wright et al. ............... | 600/443 |
| 5,566,675 A | 10/1996 | Li et al. | |
| 5,568,813 A | 10/1996 | Deitrich et al. | |
| 5,591,911 A | 1/1997 | Masuzawa et al. | |
| 5,675,554 A | 10/1997 | Cole et al. | |
| 5,685,308 A | 11/1997 | Wright et al. | |
| 5,795,297 A | 8/1998 | Daigle | |
| 5,827,188 A | 10/1998 | Wright et al. | |
| 5,831,168 A | 11/1998 | Shinomura et al. | |
| 5,832,923 A * | 11/1998 | Engeler et al. ............. | 600/459 |
| 5,856,955 A | 1/1999 | Cole et al. | |
| 5,882,307 A | 3/1999 | Wright et al. | |
| 5,882,309 A | 3/1999 | Chiao et al. | |
| 5,897,501 A | 4/1999 | Wildes et al. | |
| 5,905,692 A | 5/1999 | Dolazza et al. | |
| 5,919,137 A | 7/1999 | Finger et al. | |
| 5,957,852 A | 9/1999 | Hossack et al. | |
| 5,995,450 A | 11/1999 | Cole et al. | |
| 5,997,479 A | 12/1999 | Savord et al. | |

(Continued)

FOREIGN PATENT DOCUMENTS

JP      07 313508 A      5/1995

*Primary Examiner*—Francis J. Jaworski
(74) *Attorney, Agent, or Firm*—Dean D. Small; Small Patent Law Group

(57) ABSTRACT

A method and apparatus for acquiring multi-line acquisition ultrasound data. Ultrasound signals are transmitted into an area of interest. Echo signals are acquired and analyzed to produce a first data stream associated with a first receive beam. The first data stream is decimated by removing at least two consecutive data samples therefrom, while passing at least two consecutive data samples to form a first decimated data stream. Using this decimation pattern, a bandwidth of one-half to three-quarters of the data sampling rate after decimation may be achieved.

18 Claims, 5 Drawing Sheets

U.S. PATENT DOCUMENTS

| | | |
|---|---|---|
| 6,013,032 A | 1/2000 | Savord |
| 6,042,547 A | 3/2000 | Wright et al. |
| 6,066,099 A | 5/2000 | Thomenius et al. |
| 6,089,096 A | 7/2000 | Alexandru |
| 6,104,673 A | 8/2000 | Cole et al. |
| 6,172,939 B1 | 1/2001 | Cole et al. |
| 6,292,433 B1 | 9/2001 | Gilbert et al. |
| 6,363,033 B1 | 3/2002 | Cole et al. |
| 6,366,227 B1 | 4/2002 | Rigby |
| 6,409,667 B1 | 6/2002 | Hossack |
| 6,491,634 B1 | 12/2002 | Leavitt et al. |
| 6,497,664 B1 | 12/2002 | Randall et al. |
| 6,500,120 B1 | 12/2002 | Anthony |
| 6,666,823 B2 | 12/2003 | Yao |
| 6,669,640 B2 | 12/2003 | Bae |
| 6,673,016 B1 | 1/2004 | Bolorforosh et al. |
| 6,679,845 B2 | 1/2004 | Ritter et al. |
| 6,695,783 B2 | 2/2004 | Henderson et al. |
| 2001/0051772 A1 | 12/2001 | Bae |

\* cited by examiner

ULTRASOUND METHOD AND APPARATUS FOR MULTI-LINE ACQUISITION

CROSS REFERENCE TO RELATED APPLICATION

The application relates to and claims priority from provisional patent application Ser. No. 60/477,826, titled "Ultrasound Method and Apparatus for Multi-Line Acquisition", filed Jun. 12, 2003, the complete subject matter of which is expressly hereby incorporated herein in its entirety.

BACKGROUND OF THE INVENTION

The present invention relates to diagnostic ultrasound systems. In particular, the present invention relates to method and apparatus for acquiring and processing ultrasound data streams to reduce the bandwidth of the data without deteriorating the performance of the beamformer, and to share the bandwidth between two or more data streams belonging to different beams in multi-line acquisition.

FIG. 3 illustrates a typical configuration of a receive beamformer 200. Digitized channel signals are input to a number of identical signal processing devices (beamformer ASICs) 202-206, that are interconnected in a beamsum pipeline. The ASIC 202 performs a partial beam formation of channels 1-8. The partial beamsum 208 is then input to ASIC 204 and added to the partial beamsum of channels 9-18 within ASIC 204. This process is continued down the beamsum pipeline until the final beamsum 210 is coming out of the last ASIC 206 in the chain.

For a time-delay beamformer, such as receive beamformer 200, the data may typically be 20 bit wide and have a data rate of 40 MHz per beam, i.e. 800 Mbit/s data bandwidth. With simultaneous reception of parallel beams, or multi-line acquisition (MLA), this data rate is multiplied by the number of parallel beams. The cost of the interconnect infrastructure within the ultrasound system increases with data bandwidth, as more pins are required on integrated circuits for signal processing, more pins on circuit board connectors, or a faster clock rate of the data paths.

FIG. 4 illustrates the contents of the partial beamformer ASICs 202-206 of FIG. 3. An input data rate (sampling rate) of 40 MHz is assumed, although other data rates may be used. Each channel 1-8 is processed through a per-channel beamformer 212-216. The per-channel beamformers 212-216 perform per-channel beamforming (time delay and optionally per-channel amplitude weighting).

The output from the beamsummer 218, the partial beamsum 208, is then passed through a low-pass anti-aliasing filter 220 that cuts off frequencies above 10 MHz, reducing the bandwidth of the signal. Data output from the low-pass anti-aliasing filter 220 is represented as data stream A 224, following a sequence of samples A1 A2 A3 A4 A5 . . . and so on. A decimator 222 then reduces the data rate by throwing away every other sample of the data stream A 224 to produce data stream B 226, giving the sample sequence of A1 X A3 X A5 X . . . and so on. The X's in data stream B 266, and all subsequent data streams discussed herein, represent data samples which have been thrown away. Data stream B 226 is then summed by summer 228 with a cascading input 230. The cascading input 230 may be supplied through an optional delay line 232 to allow for summing with a subsequent device. The delay line 232 may not be required for certain beamformer architectures.

Alternatively, the cutoff-rate of the anti-aliasing filter 220 may be 20 MHz/n, wherein n=1,2,3,4 . . . , allowing for a data output rate of 40 MHz/n by throwing away (n-1) samples for every sample that is retained. A larger value of n results in a greater reduction of the data rate. Unfortunately, the maximum usable frequency of the receive beamformer 200 becomes reduced by a factor n, for example, from 20 MHz to 20 MHz/n.

Thus, a system and method are desired to acquire data with a maximum frequency which is not limited to one-half the data sampling rate of the output stream that addresses the problems noted above and others previously experienced.

BRIEF DESCRIPTION OF THE INVENTION

A method for acquiring ultrasound data comprising acquiring echo signals from an area of interest, analyzing the echo signals to produce a first data stream associated with a first receive beam, and decimating the first data stream by removing at least two consecutive data samples therefrom to form a first decimated data stream.

An ultrasound system comprising a transmitter transmitting ultrasound signals into an area of interest, a receiver receiving echo signals from transmitted ultrasound signals, and a beamformer processing the echo signals to simultaneously form first and second data streams associated with different first and second receive beams. The beamformer includes a decimator removing from at least one of the first and second data streams at least two consecutive data samples, and an output outputting information based on an output of the decimator.

A decimation subsystem comprising an input receiving a first data stream comprising data samples. The decimation subsystem further comprises a first decimator receiving the first data stream and removing at least two consecutive data samples therefrom, while passing at least two consecutive data samples to output a decimated subset of the first data stream.

A method for acquiring ultrasound data comprising acquiring echo signals from an area of interest, producing first and second data streams associated with first and second receive beams based on the echo signals, and filtering the first and second data streams to form first and second filtered data sets having partially overlapping frequency bands. The method also comprises decimating the first and second filtered data sets to form first and second decimated data sets.

DETAILED DESCRIPTION OF THE INVENTION

Figure 1:
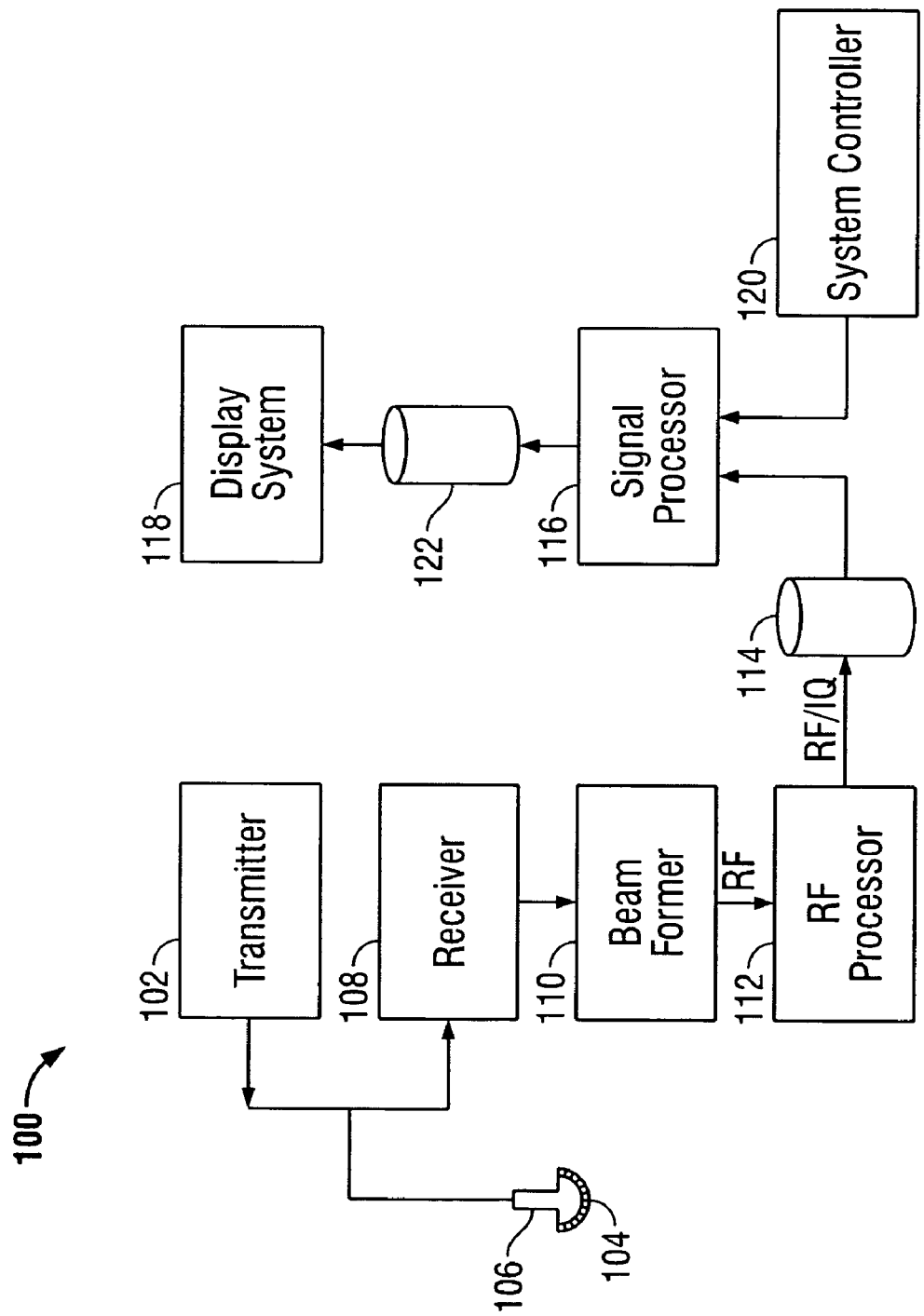
FIG. 1 illustrates a block diagram of an ultrasound system formed in accordance with an embodiment of the present invention.

FIG. 1 illustrates a block diagram of an ultrasound system 100 formed in accordance with an embodiment of the present invention. The ultrasound system 100 includes a transmitter 102 which drives an array of elements 104 within a transducer 106 to emit pulsed ultrasonic signals into a body. A variety of geometries may be used. The ultrasonic signals are back-scattered from structures in the body, like blood cells or muscular tissue, to produce echoes which return to the elements 104. The echoes are received by a receiver 108. The received echoes are passed through a beamformer 110, which performs beamforming and outputs an RF signal. The RF signal then passes through an RF processor 112. Alternatively, the RF processor 112 may include a complex demodulator (not shown) that demodulates the RF signal to form IQ data pairs representative of the echo signals. The RF or IQ signal data may then be routed directly to RF/IQ buffer 114 for temporary storage. A system controller 120 controls the operation of the components of the ultrasound system 100.

The ultrasound system 100 also includes a signal processor 116 to process the acquired ultrasound information (i.e., RF signal data or IQ data pairs) and prepare frames of ultrasound information for display on display system 118. The signal processor 116 is adapted to perform one or more processing operations according to a plurality of selectable ultrasound modalities on the acquired ultrasound information. Acquired ultrasound information may be processed in real-time during a scanning session as the echo signals are received. Additionally or alternatively, the ultrasound information may be stored temporarily in RF/IQ buffer 114 during a scanning session and processed in less than real-time in a live or off-line operation.

The ultrasound system 100 may continuously acquire ultrasound information at a frame rate that exceeds 50 frames per second—the approximate perception rate of the human eye. The acquired ultrasound information is displayed on the display system 118 at a frame-rate that may be different than that of the acquired data. An image buffer 122 is included for storing processed frames of acquired ultrasound information that are not scheduled to be displayed immediately. Preferably, the image buffer 122 is of sufficient capacity to store at least several seconds worth of frames of ultrasound information. The frames of ultrasound information are stored in a manner to facilitate retrieval thereof according to its order or time of acquisition. The image buffer 122 may comprise any known data storage medium.

Figure 2:
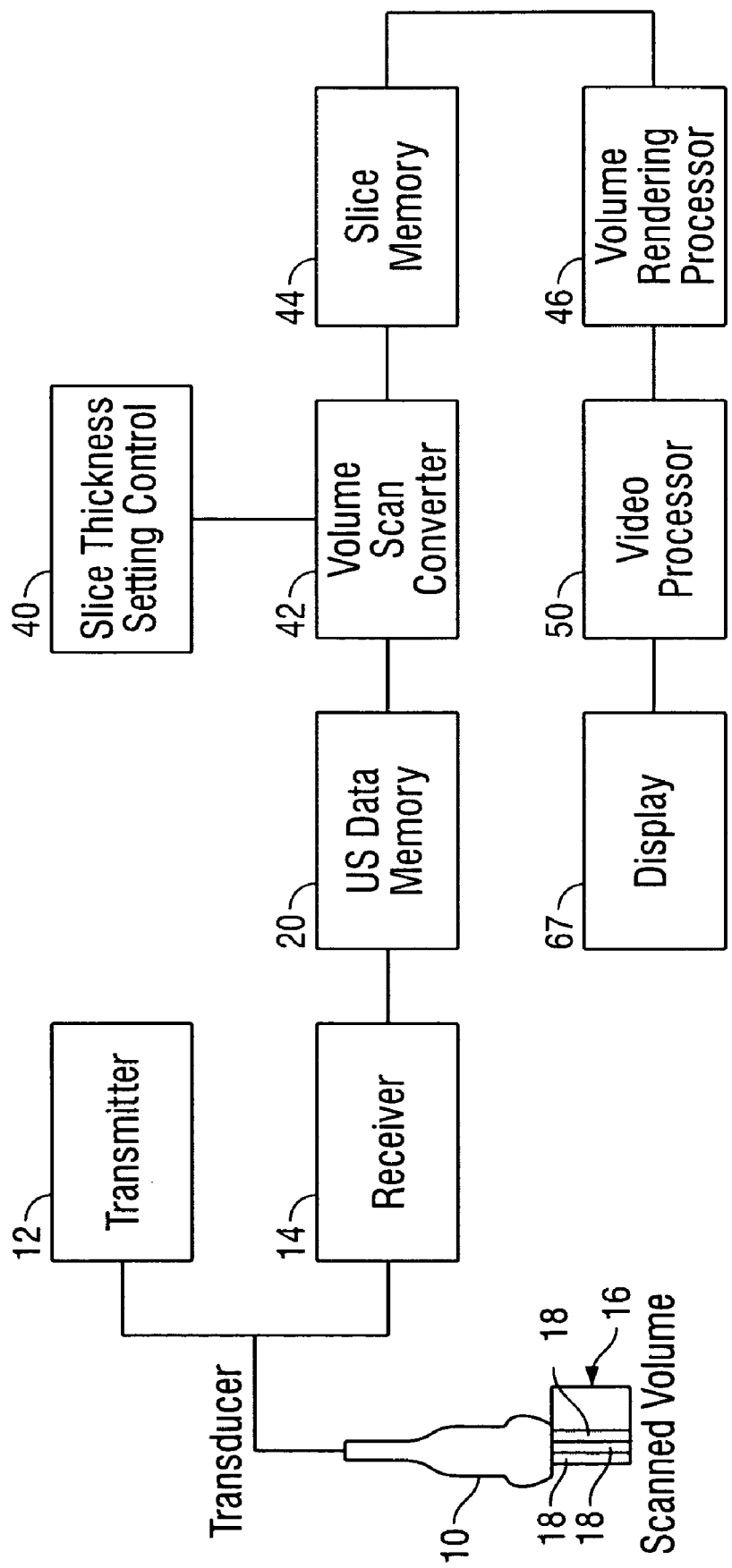
FIG. 2 illustrates an ultrasound system formed in accordance with one embodiment of the present invention.

FIG. 2 illustrates an ultrasound system formed in accordance with one embodiment of the present invention. The system includes a transducer 10 connected to a transmitter 12 and a receiver 14. The transducer 10 transmits ultrasonic pulses and receives echoes from structures inside of a scanned ultrasound volume 16. Memory 20 stores ultrasound data from the receiver 14 derived from the scanned ultrasound volume 16. The volume 16 may be obtained by various techniques (e.g., 3D scanning, real-time 3D imaging, volume scanning, 2D scanning with an array of elements having positioning sensors, freehand scanning using a Voxel correlation technique, 2D or matrix array transducers and the like).

The transducer 10 is moved, such as along a linear or arcuate path, while scanning a region of interest (ROI). At each linear or arcuate position, the transducer 10 obtains scan planes 18. The scan planes 18 are collected for a thickness, such as from a group or set of adjacent scan planes 18. The scan planes 18 are stored in the memory 20, and then passed to a volume scan converter 42. In some embodiments, the transducer 10 may obtain lines instead of the scan planes 18, and the memory 20 may store lines obtained by the transducer 10 rather than the scan planes 18. The volume scan converter 20 may store lines obtained by the transducer 10 rather than the scan planes 18. The volume scan converter 42 receives a slice thickness setting from a control input 40, which identifies the thickness of a slice to be created from the scan planes 18. The volume scan converter 42 creates a data slice from multiple adjacent scan planes 18. The number of adjacent scan planes 18 that are obtained to form each data slice is dependent upon the thickness selected by slice thickness control input 40. The data slice is stored in slice memory 44 and is accessed by a volume rendering processor 46. The volume rendering processor 46 performs volume rendering upon the data slice. The output of the volume rendering processor 46 is passed to the video processor 50 and display 67.

The position of each echo signal sample (Voxel) is defined in terms of geometrical accuracy (i.e., the distance from one Voxel to the next) and ultrasonic response (and derived values from the ultrasonic response). Suitable ultrasonic responses include gray scale values, color Doppler values, and angio or power Doppler information.

Figure 4:
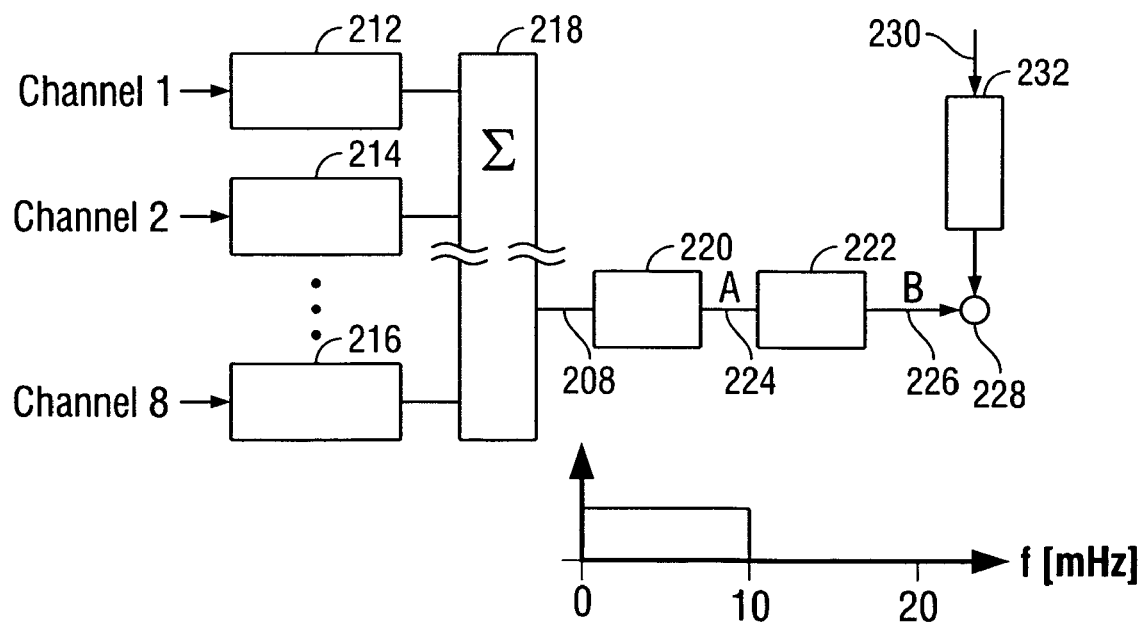
FIG. 4 illustrates the contents of the partial beamformer ASIC of FIG. 3.
Figure 5:
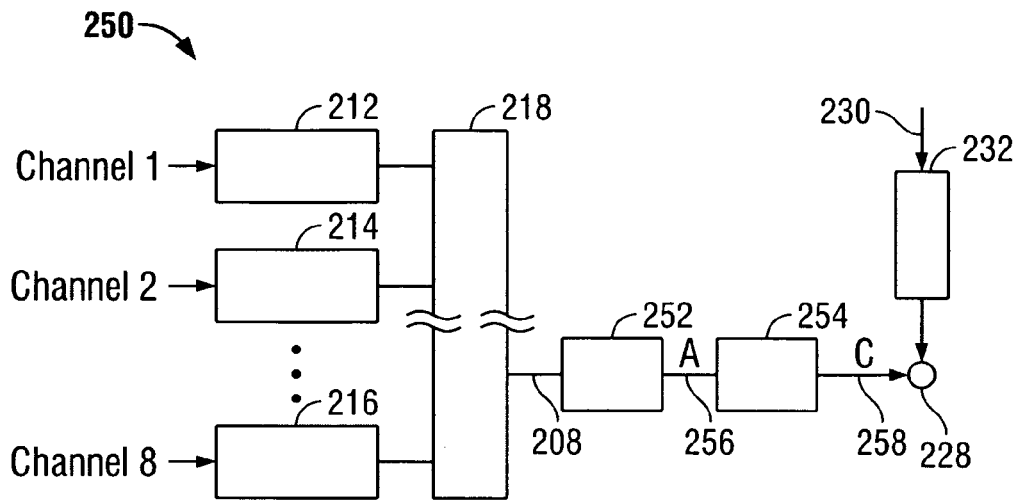
FIG. 5 illustrates the contents of a partial beamformer ASIC comprising a programmable anti-aliasing (a-a) filter in accordance with one embodiment.
Figure 5:
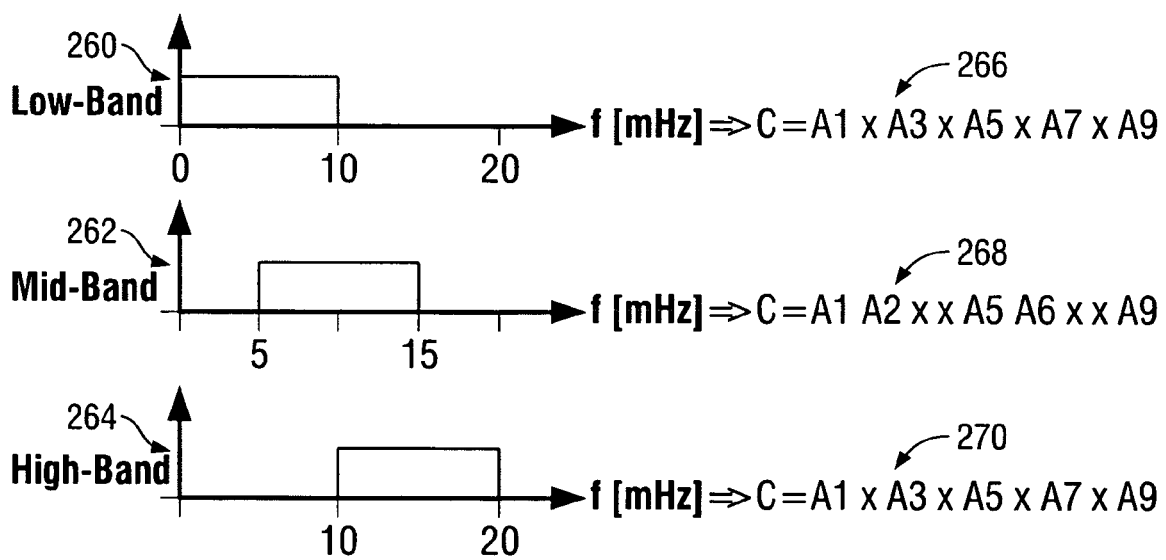

FIG. 5 illustrates the contents of a partial beamformer for a single beam in accordance with the present invention. ASIC 250 comprises a programmable anti-aliasing (a-a) filter 252. Elements corresponding to the elements in FIG. 4 have the same item numbers. Their function is similar to the previous discussion regarding FIG. 4, and thus will not be further discussed. The a-a filter 252 has a pass-band that is either "low-pass" or low-band 260, i.e. from 0-10 MHz, "band-pass" or mid-band 262 from 5-15 MHz, or "high-pass" or high-band 264 from 10-20 MHz. The a-a filter 252 provides three discrete modes of operation for the beamformer 110, with a useable frequency range corresponding to the selected pass-band of the associated a-a filter 252. The data stream A 256 output by the a-a filter 252 follows a sequence of A1 A2 A3 A4 A5 . . . and so on.

A decimator 254 functions differently for the different modes of the a-a filter 252. For the low-band 260 and high-band 264 modes, the decimator 254 decimates every other data sample in the data stream A 256, and outputs data stream C 258 following a sequence of A1 X A3 X A5 X . . . and so on. Mathematically, the data stream C 258 corresponds to multiplication of the sample stream [A1 A2 A3 A4 A5 A6 . . . ] with the sequence [101010101010. . . ]. The spectrum of the resultant waveform has frequency components centered around 0 Hz and 20 MHz, so the spectra of the a-a filtered signals in the low-band 260 and high-band 264 modes will not overlap after decimation. Those skilled in the art will recognize that all of the information in the a-a filtered signal (data stream A 256) will be fully preserved through the decimation process even for the high-band 264 filtered signal. FIG. 5 illustrates the applicable data stream C 258 for the associated a-a filter 252 mode. Data stream C 266 is associated with the low-band 260 mode, and data stream C 270 is associated with the high-band 264 mode.

When the a-a filter 252 is in the mid-band 262 mode, the a-a filter 252 outputs the data stream A 256 following the pattern of A1 A2 A3 A4 A5 A6 A7 A8 A9 A10 . . . and so on. The decimator 254 passes two consecutive data samples of the data stream A 256, and decimates two consecutive data samples of the data stream A 256. The decimator 254 therefore outputs the data stream C 258 following a sequence of A1 A2 X X A5 A6 X X A9 A10 . . . and so on. Mathematically, the data stream C 258 corresponds to multiplication of the sample stream [A1 A2 A3 A4 A5 A6 . . . ] with the sequence [1 1 0 0 1 1 0 0 1 1 0 0 1 1 0 0 . . . ]. The spectrum of the resultant waveform has frequency components centered around 0 Hz and 10 MHz only, so even in this case the spectrum of the a-a filtered signals will not overlap after decimation. Those skilled in the art will recognize that all of the information in the a-a filtered signal (data stream A 256) will be fully preserved through the decimation process. FIG. 5 illustrates the data stream C 268 for the associated mid-band 262 mode.

From the previous description, it is clear that the entire frequency range from 0 to 20 MHz is now covered with three overlapping frequency bands with a (real) data rate of only 20 MHz. Although FIG. 5 illustrates a 40 MHz sampling frequency, it should be understood that sampling frequencies other than 40 MHz may be used.

Reducing the data rate by decimation does not affect the delay or phase of different data streams. Therefore, the decimation process may be performed at any stage of the beamforming process. Alternatively, the a-a filter 252 and decimator 254 may be moved up within the process and replicated as a part of the per-channel beamformer 212.

Figure 6:
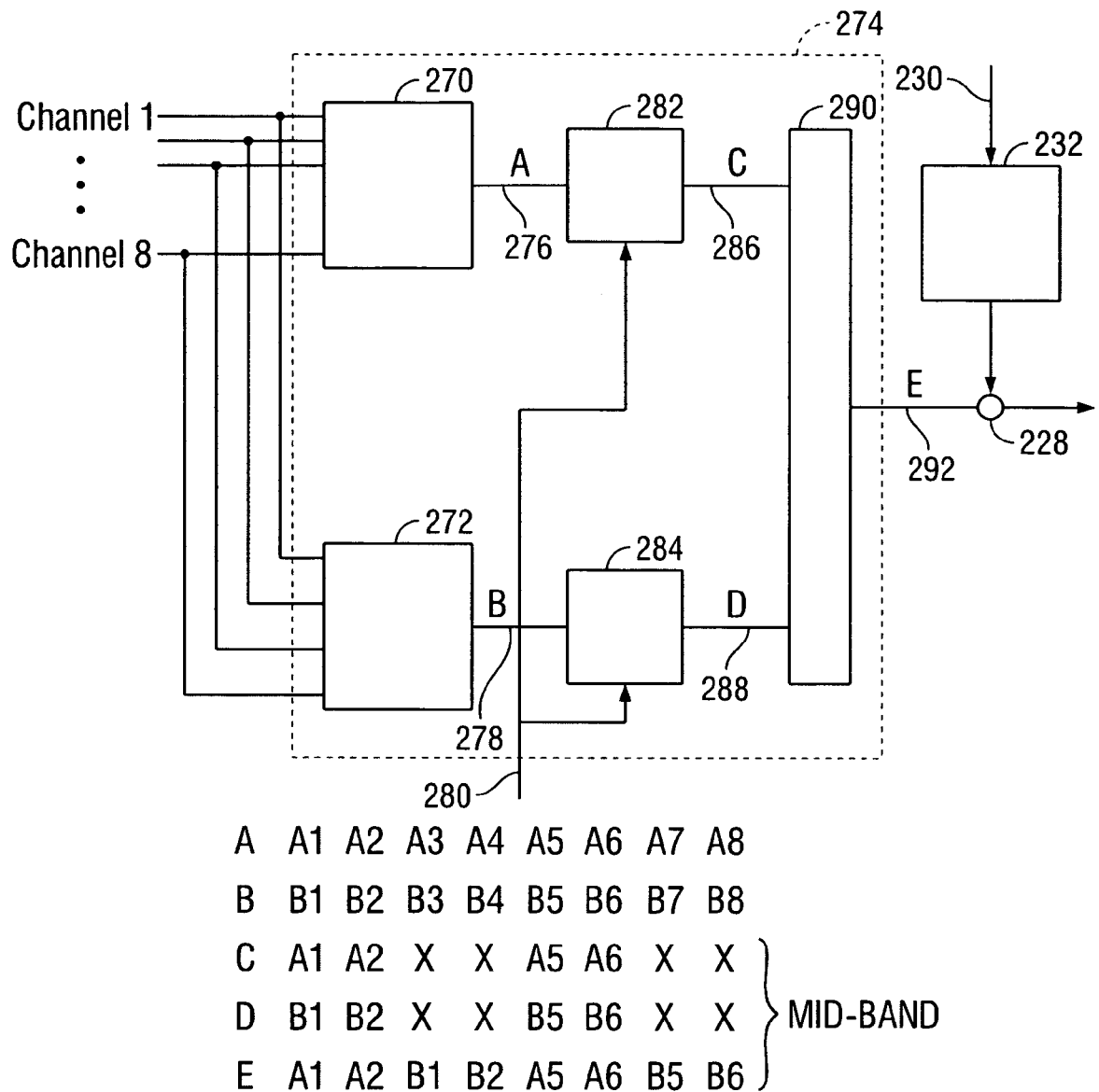
FIG. 6 illustrates multiplexing two data streams into a single data stream in accordance with one embodiment

FIG. 6 illustrates how the data streams from two partial beamformers can be multiplexed into a single 40 MHz data stream. Each single beam partial beamformer 270 and 272 comprises a set of per-channel beamformers 212-216, such as for 8 or 16 channels. The number of per-channel beamformers 212-216 in each single beam partial beamformer 270 and 272 is determined by the hardware implementation. Therefore, single beam partial beamformers 270 and 272 receive signals through channels as discussed previously in relation to FIG. 4. The single beam partial beamformers 270 and 272, however, receive signals from the same set of channels, and are typically receiving beams that are spatially different. The single-beam partial beamformers 270 and 272 output data stream A 276 and data stream B 278, respectively. Data stream A 276 follows a sequence of A1 A2 A3 A4 A5 A6 A7 A8 A9 A10 . . . and so on. Data stream B 278 follows a sequence of B1 B2 B3 B4 B5 A6 B7 B8 B9 B10 . . . and soon.

The function of the a-a filter 252 and decimator 254 remain the same as previously discussed for FIG. 5, and have been illustrated in FIG. 6 as a-a filter/decimators 282 and 284. A mode select line 280 provides an input to the a-a filter/decimators 282 and 284 from the system controller 120 that selects the band-pass mode, either low-band 260, mid-band 262, or high-band 264. The input indicates to the ultrasound system 100 which band to operate for a given beam.

When either low-band 260 or high-band 264 are selected, the data streams C 286 and D 288 follow the patterns: C=A1 X A3 X A5 X A7 X A9 X . . . and so on, and D=B1 X B3 X B5 X B7 X B9 X . . . and so on. The data streams C 286 and D 288 are input to a MUX/FIFO 290. The MUX/FIFO 290 multiplexes the two inputs and outputs data stream E 292, which follows the pattern of A1 B1 A3 B3 A5 B5 A7 B7 A9 B9 . . . and so on.

If the mid-band 262 mode is selected, the data streams C 286 and D 288 follow the sequences: C=A1 A2 X X A5 A6 X X A9 A10 . . . and so on, and D=B1 B2 X X A5 A6 X X A9 A10 . . . and so on. The data streams C 286 and D 288 are input to the MUX/FIFO 290, which multiplexes the two inputs and outputs data stream E 292, which follows the sequence of E=A1 A2 B1 B2 A5 A6 B5 B6 A9 A10. and so on. The data streams A 276, B 278, C 286, D 288, and E 292 for the mid-band 262 mode are illustrated on FIG. 6 for clarity. It should be understood that other forms of multiplexing that provide equivalent function also exist, for example data stream E 292 may be E=A1 B1 A2 B2 A5 B5 A6 B6 A9 B9 A10 B10 . . . and so on.

Figure 3:
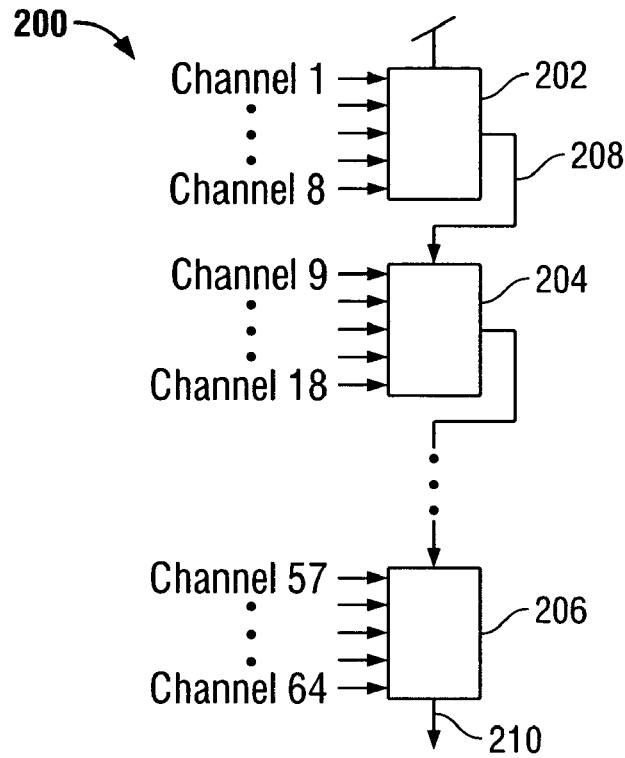
FIG. 3 illustrates a typical configuration of a receive beamformer.

The data stream E 292 is sent to the summer 228, which sums the data stream E 292 with the cascading input 230. As previously discussed, the delay line 232 is optional. Typically, a single ASIC 274 may be used to perform the function of one or more of the single-beam partial beamformers 270-272, a-a filter/decimators 282-284, and MUX/FIFO 290. The complete multi-beam beamformer topology comprises a plurality of partial beamformers 270-272, or ASICS 274, in cascade, interconnected with a single 40 MHz data stream in the same way as shown in FIG. 3, i.e. using a single data stream connecting the partial beamformers 270-272 or ASICS 274. Therefore, a 2-factor reduction of the interconnect data rate between the partial beamformers 270-272, or ASICS 274, may be accomplished without compromising the operating frequency range of the beamformer 110, as two (or N) single-beam partial beamformers 270-272 or ASICs 274, each having a data rate of 20 MHz, may be multiplexed into the 40 MHz output data stream.

Figure 7:
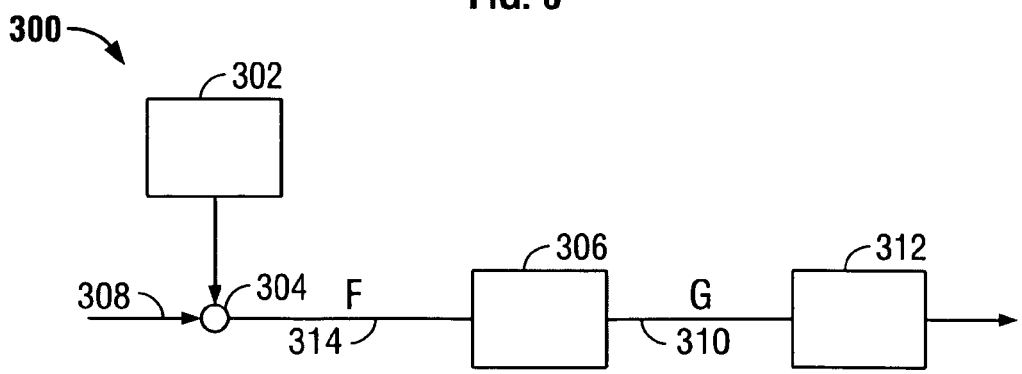
FIG. 7 illustrates a complex demodulator which may be used in connection with the systems of FIGS. 4 and 5 in accordance with one embodiment.

FIG. 7 illustrates a complex demodulator 300 which may be used in connection with the systems of FIGS. 5 and 6. The complex demodulator 300 may be included in the RF processor 112. The beamsum output data streams 308 from the last partial beamformer in the cascade topology is input to the multiplier 304, such as data stream C 258 (FIG. 5) or data stream E 292 (FIG. 6).

In the case of low-band 260 or high-band 264, data demodulation can be done in the following way. The input data stream 308 may be either low-band 260 or high-band 264 data and comprise data samples from data streams C 286 and D 288 (FIG. 6). A RAM table 302 provides a complex, time dependent demodulation waveform to a multiplier 304. For example, the waveform may be $M=\exp(-j*2*pi*f*k/fs/2)$, $k=0,1,2\ldots$, where a constant demodulation frequency f and a demodulation amplitude of 1 has been assumed for simplicity. The sampling frequency fs=40 MHz and k is the running time index. Therefore, assume that the desired demodulation data stream for the decimated data stream C 286 is Mc1 Mc2 Mc3 Mc4, and that the desired demodulation data stream for data stream D 288 is Md1 Md2 Md3 Md4. The multiplier 304 interleaves M, input from the RAM table 302, with data streams C 286 and D 288, and outputs data stream F 314, where F=Mc1 Md1 Mc2 Md2 Mc3 Md3 Mc4 Md4 . . . and so on.

The data stream F 314 is filtered by a FIR filter 306, typically with real coefficients. For simplicity, assume that the desired impulse response of the FIR filter 306 is the same for both data streams, such as h1 h2 h3 h4 . . . , h(N). The desired operations if the demodulator in this case are, therefore, c=h conv (C*Mc) and d=h conv (D*Md) where "conv" means "convolved with". By selecting the FIR filter 306 coefficients as the desired impulse response interleaved with zeros, H={h1 0 h2 0 h3 0 . . . h(N)}, one who is skilled in the art will realize that the output demodulation data stream G 310 then becomes G=c1 d1 c2 d2 c2 d3 c3 d3 . . . and so on, as desired.

The following applies if the beamsum input data stream 308 is mid-band 262 data, such as data stream C 268 (FIG. 5). Mathematically demodulation can be done by inserting two zero samples between the mid-band 262 sample pairs, such that input data stream 308 may be represented by Cz=A1 A2 0 0 A5 A6 0 0 A9 A10 0 0 . . . and so on. The RAM table 302 provides the complex, time dependent signal to the multiplier, for example Mz=exp (−j*2*pi*f*k/fs), k=0,1,2, . . . where a constant demodulation frequency f and a demodulation amplitude of 1 has been assumed for simplicity. The demodulation waveform Mz has been sampled at the original sampling frequency, such as fs=40 MHz. The data stream F 314 output by the multiplier 304 is then filtered by the FIR filter 306 with the desired coefficients {h(k)}, k=1,2,3, . . . N. The output of the filter is decimated by two by throwing away every other sample to give a data output rate that is the same as the input data rate of 20 MHz. The 20 MHz output demodulation data stream G 310 will be G=g1 g2 g3 g4 g5 . . . .

It may be noted in the above example that one-half of the samples of the sequence Mz*Cz (or data stream F 314) are zeros that don't contribute to the output sum. Moreover, because the bandwidth of the input data stream 308 is limited to 10 MHz, the sampling rate of the complex data output can be reduced to 10 MHz without loss of information.

Therefore, an alternative demodulation sequence requiring only half the data rate in the FIR filter 306 /multiplier 304 may be accomplished even when the beamsum input data stream 308 is mid-band 262 data. The input data stream 308 may be represented by Cz=A1 A2 A5 A6 A9 A10 . . . and so on. The input data stream 308 is input at a 20 MHz rate. The multiplier 304 interleaves the input data stream 308 and the samples of Mz from the RAM table 302 that correspond to the non-zero samples of Cz, i.e. {Mz(k)}, k=1, 2, 5, 6, 9, 10, . . . and so on.

The FIR filter 306 filters the data stream F 314 with a coefficient set that is different for the odd and even numbered time index. Assuming for simplicity that N=4*m−2, where m is an integer, the odd-sample coefficients are {ho}={h1 h2 h5 h6 h9 h10 . . . h(N−1) h(N)} and the even-sample {he}={h7 h8 h11 . . . h(N−2) 0} Thus, the coefficients of the FIR filter 306 toggle back and forth between {ho} and {he} for every other sample. The output becomes G=g1 g2 g3 g4 g5 . . . as in the previous example. If the output rate is limited to 10 MHz, the complication of using time dependent coefficients can be avoided. It is then possible to use only one coefficient set, such as {ho}, and use only the odd numbered output data from the FIR filter 306. The even samples need to be thrown away by the decimator 312, so the output becomes G=g1 x g3 x g5 x . . . .

The following example illustrates demodulating multiplexed mid-band 262 data, such as data stream E 292 (FIG. 6), wherein the data are interleaved two and two as discussed previously. For simplicity, assume that the desired demodulation waveform for data stream C 286 is Mc1 Mc2 Mc3 Mc4 . . . and so on, and that the desired demodulation waveform for data stream D 288 is Md1 Md2 Md3 Md4 . . . and so on. Moreover, assume that the desired impulse response of the FIR filter 306, {h1 h2 h3 h4 . . . , h(N)} is the same for both data streams C 286 and D 288. The desired operations are, in other words, c=h conv (C*Mc) and d=h conv (D*Md) where conv means "convolved with".

Complex demodulation will result by making M an interleaved version of data streams C 286 and D 288, taking two samples of each at a time, M=Mc1 Mc2 Md1 Md2 Mc3 Mc4 Md3 Md4 . . . and so on, and selecting the FIR filter 306 coefficients as the desired impulse response interleaved with zeros. Assuming a 10 MHz output rate (decimation by two on the output) only one set of coefficients is necessary. These coefficients become Ho={ho(1) ho(2) 0 0 ho(3) ho(4) 0 0 ho(5) ho(6) 0 0 . . . ho(N−1) ho(N))} The demodulation data stream G 310 output from the FIR filter 306 will be {x c1 x d1 x c3 x d3 x c5 x d5 x c7 x d3 . . . }. For clarity, x indicates that a data sample is thrown away by the decimator 312, and the output data are {c1 c3 c5 . . . }and {d1 d3 d5 . . . }, and G=c1 d1 c3 d3 . . . and so on.

It should be noted that the data streams C 258 (FIG. 5) and E 292 (FIG. 6) may be sent to a common complex demodulator, such as the complex demodulator as shown in FIG. 7. Therefore, the same FIR filter 306 may be used for data streams having every other data sample removed, and for data streams having two or more consecutive data samples removed by changing the coefficients of the FIR filter 306 through software, without modifying any hardware within the beamformer 110.

Thus, by using the decimation and multiplexing system as illustrated in FIGS. 5 and 6, namely, by decimating at least two consecutive data samples, an additional bandwidth (mid-band 262 of 5-15 MHz), or data sampling rate of one-quarter to three-quarters of the data sampling rate after decimation, may be achieved. Therefore, the maximum usable frequency range of the beamformer in a decimating mode may be expanded while maintaining the data rate at 20 MHz, for example. As overlapping frequency bands may be obtained, the image performance of transducers 10 having a center frequency close to 10 MHz is improved. As stated previously, transducers 10 having other center frequencies may also be used and achieve improved image performance.

While the invention has been described in terms of various specific embodiments, those skilled in the art will recognize that the invention can be practiced with modification within the spirit and scope of the claims.

What is claimed is:

1. A method for acquiring ultrasound data, comprising:
   transmitting ultrasound signals from a transducer into an area of interest;
   receiving, at the transducer, ultrasound echo signals from the area of interest;
   converting said ultrasound echo signals received at the transducer into a first data stream associated with a first receive beam; and
   decimating said first data stream by passing at least two consecutive data samples and by removing at least two other consecutive data samples therefrom to form a first decimated data stream.

2. The method of claim 1, further comprising:
   analyzing said echo signals to produce a second data stream associated with a second receive beam that is spatially different from said first receive beam; and
   multiplexing said first and second data streams together.

3. The method of claim 1, further comprising:
   analyzing said echo signals to produce a second data stream associated with a second receive beam that is spatially different from said first receive beam; and
   decimating said second data stream by passing at least two consecutive data samples and by removing at least two other data samples therefrom to form a second decimated data stream.

4. The method of claim 1, further comprising
   analyzing said echo signals to produce a second data stream associated with a second receive beam that is spatially different from said first receive beam; and
   decimating said second data stream to pass at least two consecutive data samples that align in time with said two other data samples removed from said first data stream.

5. The method of claim 1, further comprising acquiring said echo signals simultaneously from multiple different receive beams and repeating said analyzing and decimating steps for multiple data streams associated with said multiple different receive beams.

6. An ultrasound system, comprising:
   a transmitter for transmitting ultrasound signals into an area of interest;
   a receiver for receiving ultrasound echo signals from the area of interest from transmitted ultrasound signals;
   a beamformer processing said echo signals to simultaneously form first and second data streams associated with different first and second receive beams;
   a decimator for passing consecutive data samples from at least one of said first and second data stream and for removing consecutive data samples from said first and second data streams, said decimator removing a different number of consecutive said data samples based on a band-pass mode; and
   a multiplexor for combining said first and second data streams such that data samples passed in said first data streams are intermixed with data samples passed in said second data stream to form a multiplexed data stream.

7. The ultrasound system of claim 6, further comprising at least two processors receiving and dividing said echo signals from said receiver into said first and second data streams, said first and second receive beams differing spatially with respect to said receiver.

8. The ultrasound system of claim 6, further comprising an anti-aliasing filter passing data based on said band-pass mode, said band-pass mode being one of low-band, mid-band, and high-band.

9. The ultrasound system of claim 6, further comprising a system controller identifying said band-pass mode.

10. The ultrasound system of claim 6, farther comprising said band-pass mode being one of low-band, mid-band, and high-band, said at least one decimator removing two consecutive said data samples when said band-pass mode is said mid-band, said at least one decimator removing every other said data sample when said band-pass mode is said high-band.

11. A demodulator for use with an ultrasound system to demodulate ultrasound data streams, the ultrasound system having a transmitter for transmitting ultrasound signals into an area of interest, a receiver for receiving ultrasound echo signals from the area of interest from transmitted ultrasound signals, a beamformer for processing said echo signals to form a data stream, the demodulator comprising:
   an input receiving the data stream, said data stream comprising mid-band data;
   a multiplier interleaving said data stream with a time dependent signal; and
   a filter filtering said data stream, said filter further comprising coefficients having two consecutive data samples representative of a desired impulse response interleaved with two consecutive data samples being zeros, said filter outputting a filtered data stream.

12. The demodulator of claim 11, said data stream further comprising data pairs, said filter further comprising coefficients interleaved with zeros.

13. The demodulator of claim 11, said filter filtering said data stream with a coefficient set that is different for odd and even numbered time index.

14. The demodulator of claim 11, said data stream further comprising multiplexed mid-band data, said multiplexed mid-band data being interleaved every two consecutive data samples.

15. The demodulator of claim 11, said data stream having a first frequency, said filter outputting said filtered data stream at a sampling rate being one of equal to said first frequency and two times said first frequency.

16. A method for acquiring ultrasound data, comprising:
   transmitting ultrasound signals from a transducer into an area of interest;
   receiving, at the transducer, ultrasound echo signals from the area of interest;
   converting said ultrasound echo signals into first and second data streams associated with first and second receive beams, said first and second data streams having a total bandwidth;
   filtering said first and second data streams to form first and second filtered data streams, said first and second filtered data streams having a bandwidth comprising one of a low-band, mid-band, and high-band, said low-band, mid-band, and high-band bands being based on said total bandwidth; and
   decimating said first and second filtered data streams to form first and second decimated data streams; and
   multiplexing said first and second decimated data streams to form a multiplexed data stream.

17. The method of claim 16, said first and second decimated data steams having a bandwidth of one-quarters to three-quarters of said total bandwidth.

18. The method of claim 16, said filtering step applying coefficients based on said bandwidth, said coefficients being different for each of said low-band, mid-hand, and high-band bands.

* * * * *